May 10, 1932. C. W. FAULKNER 1,857,297
PIPE COUPLING
Filed Aug. 17, 1927 2 Sheets-Sheet 1
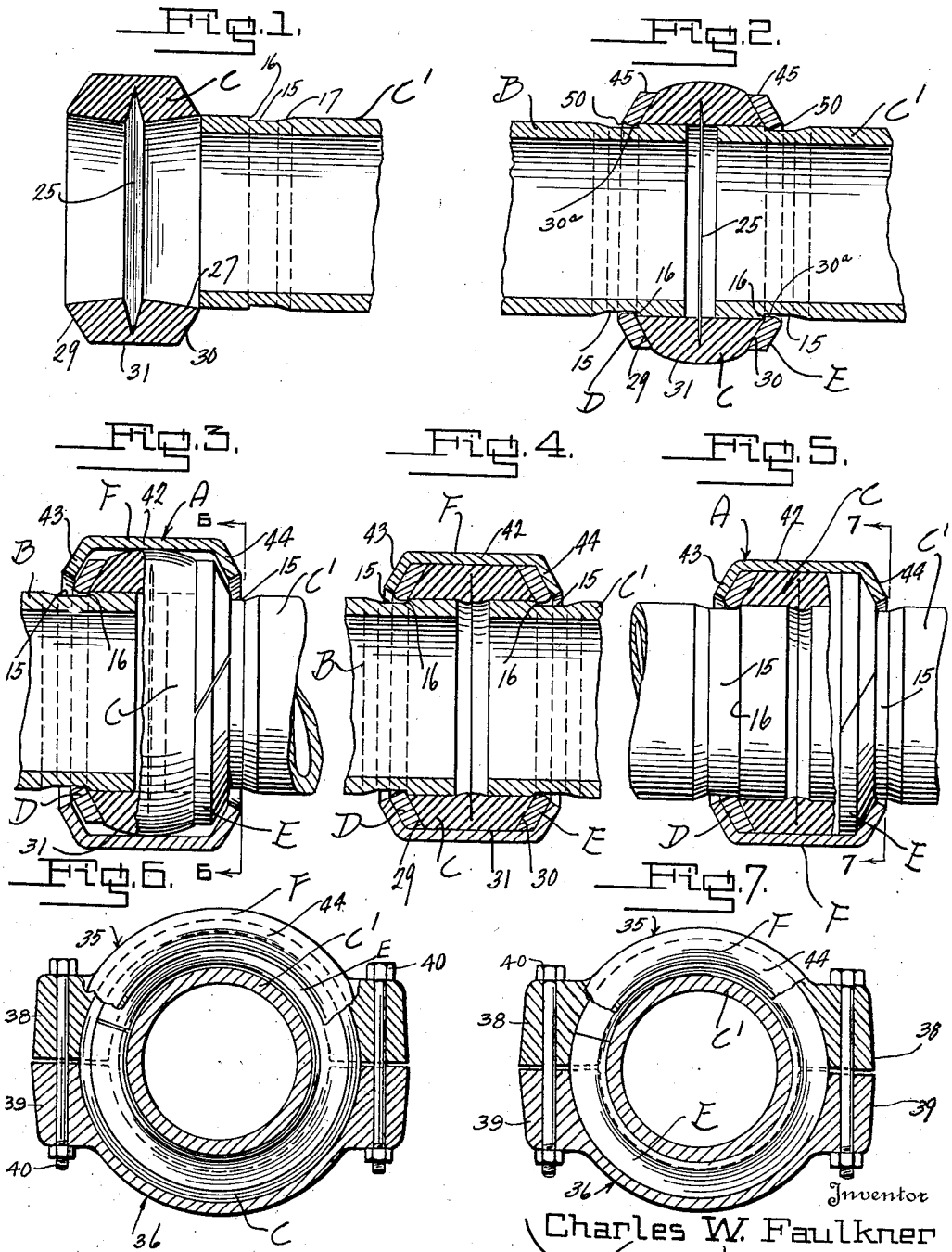
Inventor
Charles W. Faulkner May 10, 1932. C. W. FAULKNER 1,857,297
PIPE COUPLING
Filed Aug. 17, 1927 2 Sheets-Sheet 2
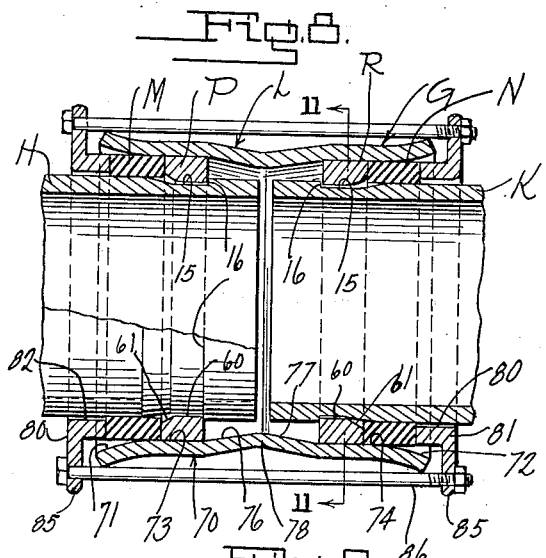
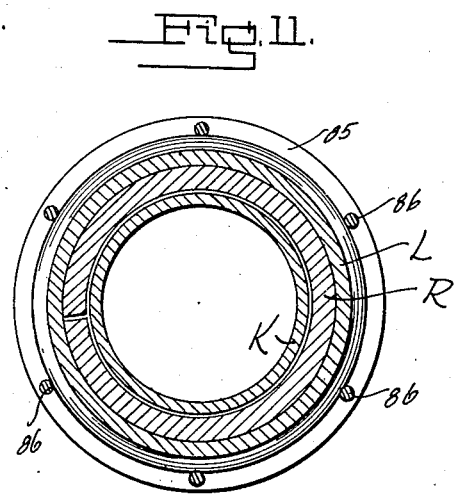
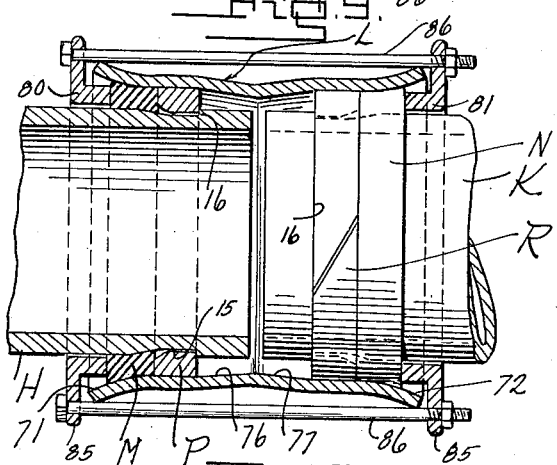
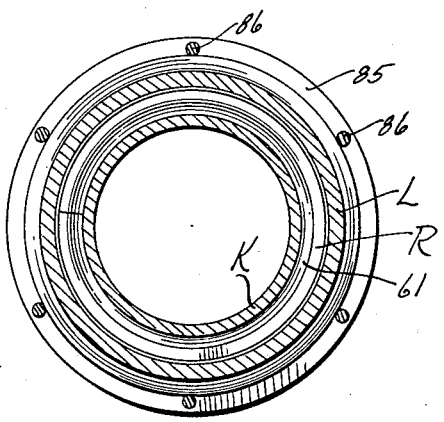
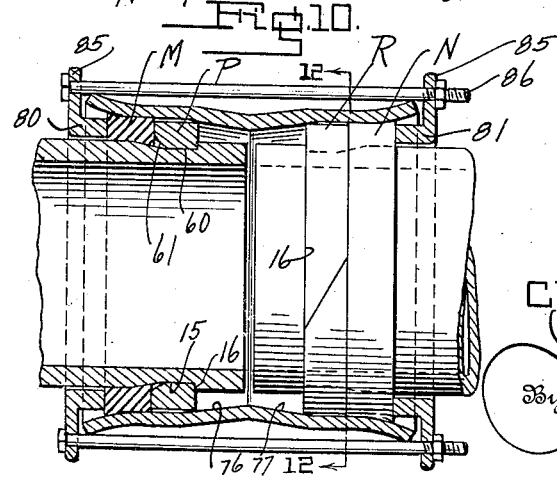
Inventor
Charles W. Faulkner
By Lancaster and Allwine
Attorney Patented May 10, 1932

1,857,297

UNITED STATES PATENT OFFICE

CHARLES W. FAULKNER, OF WELLAND, ONTARIO, CANADA

PIPE COUPLING

Application filed August 17, 1927. Serial No. 213,642.

This invention relates to improvements in pipe couplings.

The primary object of this invention is the provision of a relatively simple and efficient type of pipe coupling, which may be used for connecting the ends of pipe sections on water, gas, oil, or air lines, including a gasket, and interlocking metallic split rings associated therewith and with a casing or shell, all of which may be applied to the adjacent ends of pipe sections with facility to provide an absolutely leak-proof connection; the same doing away with threaded pipe couplings and the like, and being of such nature that the same may be easily applied by unskilled labor without the use of heavy tools, such as needed for the application of lead couplings and the like.

A further object of this invention is the provision of an improved pipe joint or coupling, embodying a ring-shaped gasket against which a clamp frame operates to initially compress the gasket into a sealing relation at the connecting end of pipe sections; the improved coupling having also associated therewith split metal rings in an interlocked grooved connection with the ends of the pipe sections, upon which the clamping action of the frame, through the gasket operates to maintain the pipe sections in an absolutely locked relation.

Other objects and advantages of this invention will be apparent during the course of the following detailed description.

In the accompanying drawings, forming a part of this specification, and wherein similar reference characters designate corresponding parts throughout the several views, Figure 1 is a sectional view showing the relation in which the preferred form of gasket is assembled upon an end of a pipe section.

Figure 2 is a longitudinal sectional view taken at the joint connection of pipe sections, showing a further step in the assemblage of the pipe coupling upon the pipe sections.

Figure 3 is a longitudinal sectional view taken at the joint connection of pipe sections, showing the manner in which a clamp shell or frame is initially clamped upon a resilient gasket to force the same into a sealing abutment at the ends of pipe sections, prior to contraction of metallic split rings into grooved connection with the pipe sections.

Figure 4 is a longitudinal sectional view taken through the improved pipe coupling, showing the same in position upon the pipe sections just before the initial clamping action is provided.

Figure 5 is a sectional view taken through the improved pipe coupling, showing its clamped applied position upon the pipe sections, in an interlocking relation therewith.

Figure 6 is a transverse sectional view taken substantially on the line 6—6 of Figure 3.

Figure 7 is a sectional view taken substantially on the line 7—7 of Figure 5.

Figure 8 is a longitudinal sectional view taken through a modified form of pipe joint, showing the same as initially applied for the connection of pipe sections, prior to final clamping action thereon.

Figures 9 and 10 are sectional views substantially similar to the parts illustrated in Figure 8, but showing succeeding steps in the application of the modified form of pipe coupling.

Figures 11 and 12 are transverse sectional views taken substantially on their respective lines in Figures 8 and 10 of the drawings.

In the drawings, wherein for the purpose of illustration are shown preferred and modified forms of the invention, the letter A may generally designate the preferred form of pipe coupling or joint construction, utilized for the securing of pipe sections B and C' in an interlocked sealed connection. The preferred form of joint A preferably comprises a novel gasket C; retaining split metallic rings D and E for the sections B and C' respectively; and a clamp shell or frame F. A modified form of pipe coupling or joint construction G is provided, for the securing of pipe sections H and K; the said joint construction G including a clamp casing or frame L, for the sealing clamped engagement of the gaskets M and N respectively for the pipe sections H and K, and for the interlocked connection of split metallic rings P and R for the pipe sections H and K respectively.

Referring to the preferred form of joint construction A, the pipe sections B and C' are provided at their adjacent ends with external grooves 15. It should be noted that the pipe sections B and C' are of standard size, and of standard thickness at the adjacent ends thereof, and that the grooves 15 are preferably shallow grooves of about one-third the thickness inwardly of the external surface of said pipe sections. The grooves 15 are of novel cross section, having abrupt annular shoulders 16 at the sides of said grooves adjacent the connected ends of the pipe sections, the opposite sides of said grooves being sloped on a bevel as at 17, to permit of ready connection and disconnection of parts. It should be mentioned that the same construction holds good for the pipe sections H and K referred to in connection with the modified form of pipe coupling G.

As to the pipe connecting joint A, the gasket C thereof is of ring-shaped formation, the same inwardly from the inner periphery of the openings therethrough being split in a V-shaped relation at 25, through part of the thickness of the said gasket, in order that the opening through said gasket will be restricted at the split 25, so as to be less in diameter than the external diameter of the pipe sections B or C' on which applied. However, from the split 25 the opening through the gasket C has an increasing diameter to the outer sides of said gasket C, as can readily be understood from Figure 1 of the drawings, so that at the outer diametered portions 27 of the opening through the gasket C, the same in dimension is slightly greater than the external diameter of the pipe sections B or C', to permit of the ready assemblage of the gasket C on the pipe sections, as is illustrated in the initial association of said parts, in Figure 1. It can readily be understood that as the pipe sections B or C' are forced into the opening thru the gasket C, the same will firmly seat about the adjacent ends of the pipe sections B and C' into an initial sealing connection. Further referring to the gasket C, it should be mentioned that the same is preferably of rubber, and preferably resilient, although the same may be of any composition construction desired. The said gasket C has the opposite sides 29 and 30 thereof sloping in a converging relation towards the outer circumference 31 of the said gasket. The gasket C is relatively thick, and of a durable and efficient sealing nature.

When the ends of the pipe sections B and C' are forced into the opening through the gasket C, the external circumference 31 of said gasket assumes a bulged relation substantially as illustrated in Figure 2 of the drawings, and the split 25, which is in fact merely a V-shaped groove, becomes contracted to the position illustrated in Figure 2.

The rings D and E are metallic split rings, which in cross section are of substantially the shape of a trapezoid. Each of the said rings are of the same construction, including the opening $30^a$ therethrough, which in diameter is slightly less than the external diameter of the sections B, and C' so that the said rings D and E will slip into their respective grooves 15 when they are applied on the pipe sections. The rings D and E are so formed that from the opening $30^a$ they flare to one side of the plane of T opening $30^a$, so that when applied in the grooves 15, the said rings D and E may lie against the converging sides 29 and 30 of the gasket C, as illustrated in Figure 2 of the drawings.

In the initial assemblage of the joint construction, the rings D and E are of course placed on the sections B and C', and then the gasket C is assembled as illustrated in Figures 1 and 2, and the metallic rings D and E slipped into the grooves 15 of the pipe sections B and C', into the position illustrated in Figure 2 of the drawings, where it is shown that the said split rings D and E cooperate against opposite sides of the gasket, the said split rings lying in grooves 15 of the pipe sections, in an expanded relation therein.

Referring to the clamp shell or frame F, the same includes the half segments 35 and 36, adapted to circumferentially encompass the gasket C and split rings D and E; the said half segments 35 and 36 each having at the ends thereof attaching flanges 38 and 39, apertured for receiving adjusting bolts 40 which may clamp the said segments 35 and 36 upon the gasket C and the split rings D and E. The segments 35 and 36 are formed in a novel relation, including the arcuate body portions 42, with the side retaining walls 43 and 44, extending in a diverging relation from the concave side of the walls 42, the same being retaining walls for respectively receiving therein and thereagainst the split rings D and E, as illustrated in the drawings.

Referring to an operative assemblage of the improved joint construction A upon the pipe sections B and C', the gasket C is assembled upon the pipe sections B and C', as above described, and the application of the split metallic rings D and E in the grooves 15 of said pipe sections, is effected, as above mentioned. It is to be noted that the gasket C when thus assembled bulges at its outer portion beyond the outer circumferential edges 45 of the split rings D and E, as illustrated in Figure 2. Thus, upon the initial clamping action of the segments 35 and 36 of the clamp shell or frame F, it is to be noted that the initial clamping action takes place upon the gasket C, as illustrated in Figure 3, and in this position the rings D and E are expanded and not in a contracted engagement in their grooves 15 of the pipe sections B and C'. Upon the application of clamping pressure the segments 35 and 36 of the clamp frame F are moved together, into such clamping relation with the gasket C, that the same is clamped upon the ends of the pipe sections B and C', between the grooves 15, in the relation illustrated in Figure 4 of the drawings, and this longitudinally moves the split rings D and E against the inner surfaces of the retaining flanges or walls 43 and 44 of the clamp frame segments as illustrated in Figure 4 of the drawings. Upon further clamping pressure tending to proximately move the segments 35 and 36, through the adjusting bolts 40, it is readily apparent that not only will the gasket C be further compressed to a sealing engagement upon the ends of the pipe sections B and C', but the split rings D and E will be forced into a clamping engagement in the grooves 15 of the pipe sections B and C', into an engaging relation at their inner peripheries against the pipe sections B and C', tending to contract the split in said rings D and E, and it is to be noted that the rings D and E when so contracted about at their inner peripheral corners against the annular shoulders 16 of said grooves 15, and thus resist any attempt to pull the pipe sections B and C' apart. This clamping action is well illustrated in Figure 5 of the drawings.

The split rings D and E, as a feature which will permit of their easy assemblage upon the pipe sections B and C', are provided at one side of the opening 30ª therethrough, with a beveled edge 50. It is to be noted that at the opposite side of the opening 30ª the split rings provide sharp corners for abutment in the shoulder corners of the grooves 15.

Referring to the modified form of coupling construction G, the pipe sections H and K are formed as above described for the pipe sections B and C', with the external grooves 15 therein providing abrupt annular shoulders 16 at the facing ends of said pipe sections H and K.

The rings P and R are of the same formation, the same being split metallic rings, substantially rectangular in cross section, providing openings 60 therethrough of a less normal diameter than the external diameter of either of the sections H and K; said split rings P and R having one corner thereof removed to provide a bevel or tapered annular edge 61 at the opening 60 which will permit of the facile assemblage of the said split rings P and R onto the ends of the pipe sections H and K, and into the grooves 15 thereof. A normal contracting action of the rings P and R is such that they will contract into their grooves 15 in the respective pipe sections.

The gaskets M and N, are preferably of the resilient type, of rubber, although the same may be of approved gasket material other than rubber. The same are of the endless type, and in cross section are rectangular, and adapted to be slipped upon the ends of the pipe sections H and K, at the outer sides of the grooves 15, so that the split metallic rings P and R are in closer facing relation at the ends of said sections H and K than the gaskets M and N.

As part of the clamping frame or construction L, the same includes a sleeve 70, having an opening therethrough with relatively large flaring entrance ways 71 and 72 in the opposite ends thereof into which the ends of the pipe sections H and K may be respectively entered. Inwardly of the flaring entrance ways 71 and 72, the sleeve 70 is provided with passageway portions 73 and 74, at the opposite sides of the medial plane of the said sleeve, upon which the split rings P and R and the gaskets M and N initially ride and seat. From the portions 73 and 74 of the opening through the said sleeve, the opening through said sleeve is gradually restricted, by converging at 76 and 77 with the internal periphery of said sleeve at opposite sides of the medial plane 78 of said sleeve; the said surfaces 76 and 77 providing cam surfaces on which the split rings P and R may respectively cooperate to be contracted as the ends of the pipe sections are slipped into the sleeve and the clamping action applied, as will be subsequently described.

As part of the clamping frame or construction L, ring-shaped followers 80 and 81 are respectively provided at opposite ends in the sleeve 70; the same being provided with openings 82 therethrough for freely slidably receiving respectively therethrough the facing ends of the pipe sections H and K. The said followers 80 and 81 are each provided with annular outstanding flanges 85, apertured, for the reception of adjusting bolts 86 therethrough, which may be adjusted to move the followers 80 and 81 longitudinally of the sleeve 70, into the opening thereof, and into clamping engagement against the washers M and N, as will be subsequently mentioned.

Referring to an assembling and operating movement of the improved joint construction G, the ring-shaped gaskets M and N are respectively slipped over the pipe sections H and K past the annular grooves 15, and thereafter the split metallic rings P and R are respectively expanded over said pipe sections H and K into the grooves 15 thereof. The pipe sections H and K with their respective split metal rings and gaskets are then moved into the opposite ends of the sleeve 70, till the gaskets and split rings are in the open portions 73 and 74 of said sleeve. The followers 80 and 81 are then adjusted by means of the bolts 86 until the followers 80 and 81 first move into a clamping engagement against the ring-shaped gaskets M and N, tending to force the same into a sealing engagement between the sleeve 70 and the respective pipe sections. It should be noted that these followers compress the gaskets M and N prior to the contractile action of the split metallic rings P and R, and after the initial compressing action on the gaskets M and N, the action of the followers due to tightening of the bolts 86, will be to move the split rings P and R against the cam peripheries 76 and 77 in the opening of the sleeve 70, compressing said split metallic rings after the initial compressing action of the gaskets M and N; said contracting of the gasket rings P and R taking place from the position illustrated in Figure 9 to the position illustrated in Figure 10, and during which the gaskets M and N are further compressed as shown in Figure 10. The split shaped rings P and R are contracted entirely into a snug abutment in the bottoms of the grooves 15, into firm engagement against the shoulders 16 of the said grooves, and the resilient ring-shaped gaskets M and N are firmly sealed between the ends of the respective pipe sections H and K, and the inner periphery of the clamping sleeve 70. In this cooperation of parts it is to be noted that the split rings P and R engage against the shoulders 16 from the position illustrated in Figure 8 to the position illustrated in Figure 10, and the cam action tending to contract the split rings is enabled incident to a longitudinal movement of the pipe sections H and K from the position illustrated in Figure 9 to the position illustrated in Figure 10.

From the foregoing description of this invention, it is apparent that a novel pipe coupling has been provided, which may replace the ordinary threaded coupling now in common use, with a saving not only in efficiency, but a material saving in labor expense, and installation expense, as well as resulting in a saving of lead. The application of the coupling is much faster than the application of the ordinary threaded coupling, and there is an absolute and positive assurance against pulling of the pipe sections apart incident to the grooved connection of the metallic split rings in the pipe sections. No special increase in thickness at the ends of the pipe sections are necessary, since the grooves 15 are relatively shallow, being cut only for about one-third of the thickness of the standard type.

Various changes in the shape, size, and arrangement of parts may be made to the forms of invention herein shown and described, without departing from the spirit of the same or the scope of the claims.

I claim:

1. In a joint the combination of a clamping ring including relatively movable complementary segments, said clamping ring being peripherally grooved at the interior thereof to provide a substantially V-shaped groove, split metallic rings seating in the groove of said clamping ring along the opposite sloping sides of said groove, and a compressible ring-shaped gasket in the V-shaped groove of said clamping ring in engagement between said split metallic rings.

2. In combination with pipe sections having annular grooves externally in adjacent ends thereof, split metallic rings seating in said grooves and externally of said grooves and beyond the outer surface of the sections converging towards each other, a compressible gasket device surrounding the ends of the pipe sections between and abutting said split rings, and an adjustable clamping ring surrounding the split rings and compressible gasket for compressing the gasket into sealing engagement with the pipe sections and contracting the split rings into said grooves of the pipe sections.

3. As an article of manufacture a coupling comprising a clamping ring of a plurality of segments, said segments being flanged at the sides thereof to provide inwardly sloping diverging walls, a compressible gasket of ring-shaped formation at the inner peripheries of said segments between said diverging walls, and metallic split rings seated at the inner peripheries of said clamping ring segments between the diverging walls of said segments and the opposite sides of said compressible gasket.

4. As an article of manufacture a coupling comprising a radially contractible clamping ring having means to contract the same, the ring having an annular groove at the inner periphery thereof of substantially V-shape cross section defining opposite inwardly divergently sloping wall surfaces, split rings lying within said groove in engagement with said sloping wall surfaces thereof, said split rings being of metal construction, and a compressible gasket of ring-shaped formation lying in said V-shaped groove in abutment between said split rings and substantially filling the space therebetween.

5. As an article of manufacture a coupling comprising a radially contractible clamping ring of metallic construction having means to adjustably contract the same, the ring having an annular groove at the inner periphery thereof of substantially V-shaped cross section defining opposite inwardly divergently sloping wall surfaces, split metallic rings adapted to lie within said groove in engagement with said sloping wall surfaces, said split rings being substantially polygonal in cross section and each having a restricted opening therethru, the said rings sloping from their restricted openings in a divergent relation outwardly from the plane of the opening of said rings so that the outer peripheral edges thereof lie in planes spaced from the planes of the respective openings therethru, and a yieldable and compressible gasket of ring-shaped formation adapted to lie within the groove of the said contractible clamping ring, said gasket inwardly from the inner periphery thereof and at the medial transverse plane of the gasket being split and annularly grooved in a V-shaped formation; the thickness of the gasket from said V-shaped groove thereof decreasing toward opposite ends of the gasket so that the opening of the gasket at said V-shaped groove is of most restricted diameter, said gasket at its ends adapted for engagement with the adjacent split rings.

6. As an article of manufacture a coupling comprising a radially contractible clamping ring of metallic construction having means to adjustably contract the same, the ring having an annular groove at the inner periphery thereof of substantially V-shaped cross section defining opposite inwardly divergently sloping wall surfaces, split metallic rings adapted to lie within said groove in engagement with said sloping wall surfaces, said split rings being substantially polygonal in cross section and each having a restricted opening therethru, the said rings sloping from their restricted openings in a divergent relation outwardly from the plane of the opening of said rings so that the outer peripheral edges thereof lie in planes spaced from the planes of the respective openings therethru, and a yieldable and compressible gasket of ring-shaped formation adapted to lie within the groove of the said contractible clamping ring, said gasket inwardly from the inner periphery thereof and at the medial transverse plane of the gasket being split and annularly grooved in a V-shaped formation; the thickness of the gasket from said V-shaped groove thereof decreasing toward opposite ends of the gasket so that the opening of the gasket at said V-shaped groove is of most restricted diameter, said gasket at its ends adapted for engagement with the adjacent split rings, said gasket having the opposite marginal edges thereof in a convergent relation from the opening thru the gasket toward the outer periphery thereof whereby to lie in snug surface engagement against the facing surfaces of the adjacent split rings.

7. In combination with pipe sections in end to end relation, each having an annular external groove at a location adjacent to but spaced from the facing ends of the sections and providing spaced shoulders, split metallic rings seating in said grooves, annular ring-shaped compressible washers on said sections at the outer ends of said split metallic rings, a sleeve receiving in the passageway thereof the ends of the pipe sections with the split rings and the compressible washers lying in said passageway, followers on the pipe sections at the opposite ends of said sleeve, and means for adjusting the followers longitudinally of the sleeve into compressing relation against said washers, said sleeve between said split metallic rings gradually sloping in a restricted relation at the passageway thereof to contract said split rings into their grooves and to close the gap between the split ends of each ring when the ring engages the shoulder nearest the end of the pipe section formed by its respective groove, upon movement of the followers towards each other.

8. In a pipe joint construction, the combination with end to end pipe sections each having an annular external groove at a location adjacent to but spaced from the facing ends, and providing spaced shoulders, a split ring seated in each of said grooves engaging the shoulder thereof, nearest the end of the pipe sections facing the companion pipe section, compressible gasket means for the ends of said pipe sections, and means for forcing the compressible gasket means and split rings into relative engagement and the rings into firm engagement with said shoulders to seal and interlock the pipe sections together.

CHARLES W. FAULKNER. [L. S.]